A. D. RAY.
MOVING PICTURE CAMERA.
APPLICATION FILED AUG. 13, 1920.

1,369,127.

Patented Feb. 22, 1921.
2 SHEETS—SHEET 1.

INVENTOR
A.D. Ray
BY
ATTORNEY

UNITED STATES PATENT OFFICE.

ALBERT D. RAY, OF CLEVELAND, OHIO, ASSIGNOR TO EMANUEL MANDELBAUM, OF CLEVELAND, OHIO.

MOVING-PICTURE CAMERA.

1,369,127.  Specification of Letters Patent.  Patented Feb. 22, 1921.

Application filed August 13, 1920. Serial No. 403,288.

*To all whom it may concern:*

Be it known that I, ALBERT D. RAY, a citizen of the United States, residing at 2284 East 89th street, in the city of Cleveland, in the county of Cuyahoga, State of Ohio, have invented certain new and useful Improvements in Moving-Picture Cameras, of which the following is a specification.

My invention relates to improvements in moving picture cameras and the object of my invention is to so simplify and dispose the mechanism of the camera that the parts may be readily accessible and thus enable an amateur or an unskilled person to manipulate and remove any of the parts with ease.

A further object is to dispense with one of the pulleys on the main shaft and its co-acting belt, and pulley on the shaft of the film roll arbor, so as to enable the case containing the film at this side of the camera to be removed as readily as the film case on the opposite side. A still further object is to provide a central drive which will allow the balancing of the film rolls and their co-acting pairs of sprockets on each side of the machine without interfering with the position and mechanism by which movement is imparted to the shutter and at the same time insure the freedom of movement of the film on the adjacent sprocket wheel and also eliminate any liability of oil being deposited upon the film from the driving gear of the shutter.

To effect these objects I have constructed and arranged the mechanism of my camera in the manner which I shall presently describe.

In the drawings like numerals indicate corresponding parts.

Figure 1:
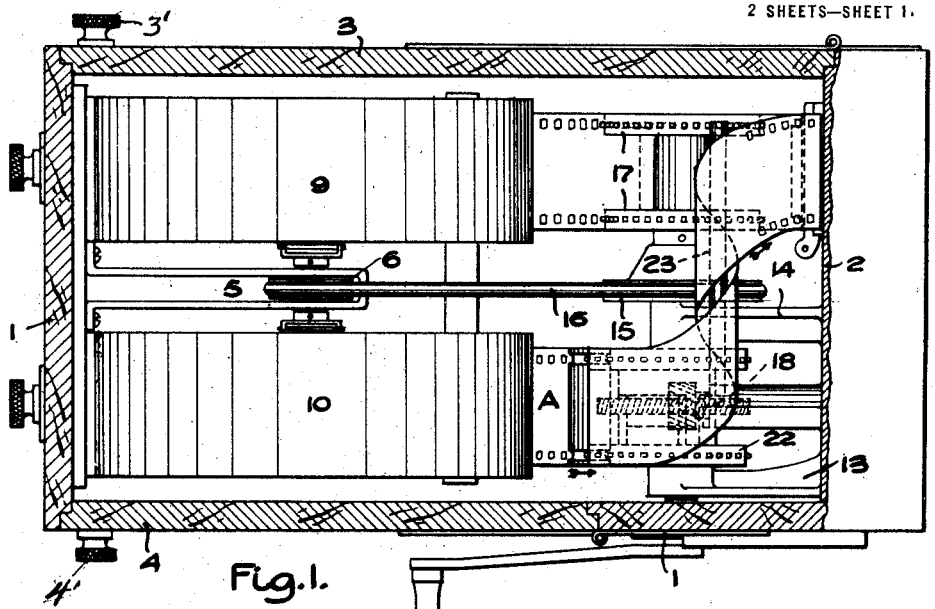
Figure 1 is a plan view of my camera with the casing mostly in section taken through line 1—1 of Fig. 2.

Heretofore it has been the custom in this class of machines to utilize two driving belts and their pulleys, the one being located on the outside of one of the film casings.

Consequently it was most inconvenient and very difficult when the side door was open to get at the film as the belt had to be removed. It was also most difficult to get the reel back as the belt would be under tension. It is with the object of overcoming this inconvenience and difficulty particularly that my invention is designed.

1 is the main casing of the camera, 2 is the front or shutter plate which is broken away at the front side. As the shutter gear on such side does not form any feature of my present invention it is therefore unnecessary to show it.

3 is the side door on one side of the casing and 4 is the door on the opposite side. The doors 3 and 4 are hinged as shown and provided with the usual knobs 3′ and 4′ respectively.

5 is a double bracket secured to the inside of the rear wall of the casing 1. 6 is a pulley secured on an arbor 7 journaled in the bracket 5.

A clutch mechanism 8 is provided on each side of the pulley, one clutch mechanism being set reversely to the other clutch mechanism in order to insure that one film roll will rotate in the opposite direction to the other roll so that the film will pay off on one roll as it winds on the other.

This clutch mechanism I do not particularly describe as it forms no feature of my present invention. The film rolls (not shown) however are located in the casings 9 and 10 and the film "A" passes out through the guide 11 on the one side as indicated by arrow in Fig. 2.

12 is the main driving arbor which is journaled in the bracket bearings 13 and 14 secured to the front plate 2, 15 is the main driving pulley secured on the shaft 12 connected by the belt 16 to the pulley 6 on the reel arbor 7. 17 is a double pin-socket secured at one end of the arbor 12. This sprocket engages the side perforation of the film "A" as is usual. 18 is a helical or worm gear which is secured to the arbor 12 and meshes with the worm 19 on the end of the arbor 20 which is journaled in the bearing 21 at the rear of the front plate 2 and from which the shutter mechanism is driven.

The helical gear 18 has a central web 18' having enlarged openings 18² and a substantially radial slot 18³. 22 is a double gear pin wheel the two rims of which are designed to mesh with the perforations of the film "A". Necessarily the two rims are at the same distance apart as the rims of the gear pin wheel 17.

Instead of the solid hub of the gear pin wheel 17 I use an open hub 22'. One of the bars 22² which extends through the slot 18³ of the helical gear 18 forms a driving connection from such gear. The other two bars of the open hub 22' extend through the openings 18².

The open hub 22' is journaled at the ends on the eccentric bosses 13' and 14' such bosses being on a center to the rear of the center of shaft 12.

Figure 2:
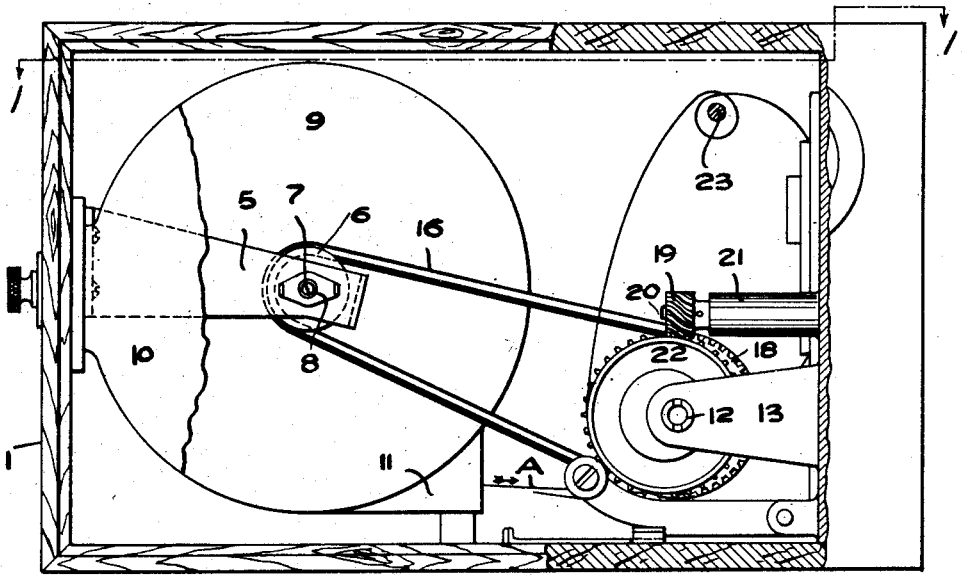
Fig. 2 is an elevation with the casing in section and the casing of the nearer film roll broken away to show the drive.
Figure 3:
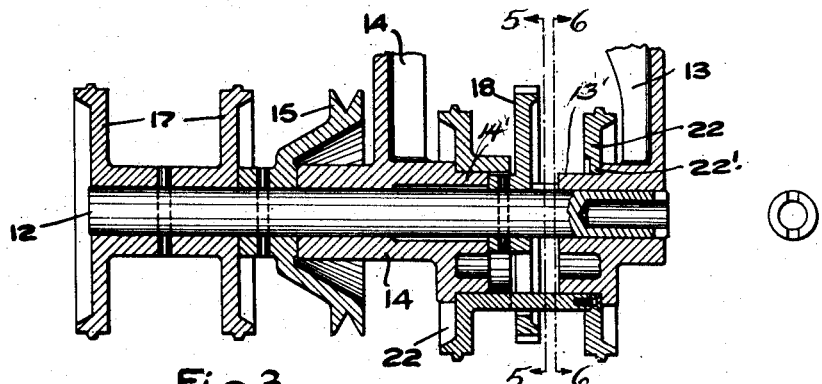
Fig. 3 is a vertical section of the various gears on the main driving arbor.
Figure 5:
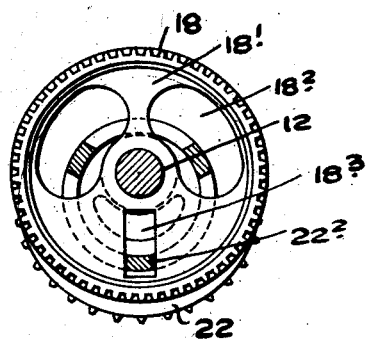
Fig. 5 is a cross section on the line 5—5 of Fig. 3 looking in the direction indicated by the arrows.
Figure 6:
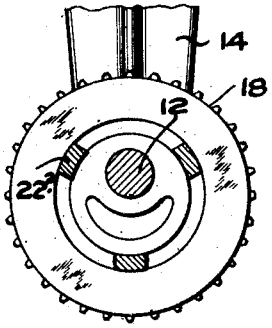
Fig. 6 is a cross section on the line 6—6 of Fig. 3 looking in the direction indicated by the arrows.
Figure 4:
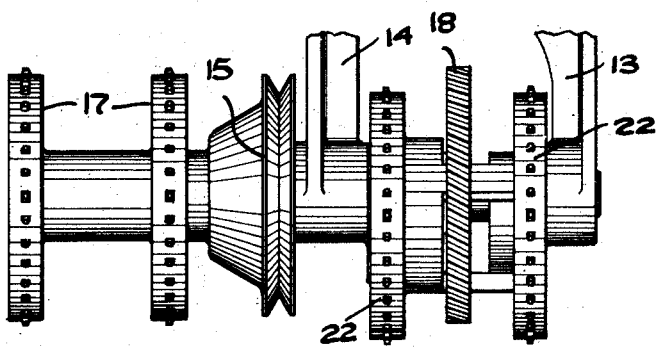
Fig. 4 is a side elevation of the gears on the main driving arbor.

The course of the film is indicated by arrows in Figs. 1 and 2 where it will be seen it passes spirally around a cross-rod, 23 in its course from one gear pin wheel to the other.

It will be seen that the eccentric journaling of the gear pin wheel 22 provides for the free movement of the film without any liability of the gear wheel 18 scraping the film or oil being deposited from such gear wheel upon the film.

By reason of the bar 22ª engaging in the slot 18³ it will be evident that movement imparted to the helical gear 18 will be transmitted to the open hub 22' and that as the hub and gear rotate the bar 22² will be caused to reciprocate radially in the slot 18³.

By such a construction as I have described I am enabled to produce a camera of this type, of a maximum simplicity and convenience in both its construction and drive.

What I claim as my invention is:

1. In a moving picture camera, the combination with the reel arbor suitably journaled at the rear of the casing, the reels and casings therefor, the film and the pulley secured to the reel arbor between the reel casings, of the main driving arbor journaled at the front of the casing, a pulley located centrally on the main driving arbor, a belt connecting the two pulleys, and a double gear pin wheel secured on the main arbor at one end thereof, a helical driving gear for the shutter mechanism, secured on the opposite end of the main arbor, and a double gear pin wheel eccentrically journaled with respect to the center of the driving arbor and between the rims of which the helical gear is located and a driving means between the double gear pin wheel and the helical gear.

2. In a moving picture camera, the combination with the reel arbor suitably journaled at the rear of the casing, the reels and casings therefor, the film and the pulley secured to the reel arbor between the reel casings, of the main driving arbor journaled at the front of the casing, a pulley located centrally on the arbor, a belt connecting the two pulleys and a double gear pin wheel secured on the main arbor at one end thereof, a helical driving gear for the shutter mechanism secured on the opposite end of the main arbor and provided with a radial slot in the web thereof, and a double gear pin wheel eccentrically journaled on a bearing surrounding the main arbor, and provided with an open hub comprising bars connecting the rims thereof, one of the bars extending through and designed to reciprocate in the radial slot as the gear pin wheel is caused to rotate.

3. In a camera, a film feed mechanism comprising a main driving arbor from which the reel arbor is adapted to be driven, film engaging sprockets through which said driving arbor extends, one of said sprockets being eccentrically mounted to revolve about a center offset from the arbor center, a gear wheel mounted on the arbor, and a drive connection between said gear wheel and eccentric sprocket.

4. The combination with the structure recited in the preceding claim of a shutter operating mechanism including a shaft and a gear carried thereby meshing with the gear wheel on the arbor.

In testimony whereof I affix my signature.

ALBERT D. RAY.